United States Patent
Kim

(10) Patent No.: US 7,480,279 B2
(45) Date of Patent: Jan. 20, 2009

(54) APPARATUS AND METHOD FOR TRANSMITTING A CONTROL MESSAGE ON A PACKET DATA CONTROL CHANNEL IN A MOBILE COMMUNICATION SYSTEM SUPPORTING A PACKET DATA SERVICE

(75) Inventor: Min-Goo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 973 days.

(21) Appl. No.: 10/963,540

(22) Filed: Oct. 14, 2004

(65) Prior Publication Data

US 2005/0078641 A1    Apr. 14, 2005

(30) Foreign Application Priority Data

Oct. 14, 2003    (KR) .................. 10-2003-0071457

(51) Int. Cl.
   *H04B 7/216*    (2006.01)
(52) U.S. Cl. .................. 370/335; 370/342; 370/349; 370/209; 370/320; 370/441; 370/208; 375/152; 375/346; 455/67.13; 455/63.1
(58) Field of Classification Search .............. 370/335, 370/342, 349, 209, 320, 338, 352
   See application file for complete search history.

(56) References Cited

U.S. PATENT DOCUMENTS

| | | | | |
|---|---|---|---|---|
| 6,839,336 | B2* | 1/2005 | Tiedemann et al. | 370/335 |
| 7,050,405 | B2* | 5/2006 | Attar et al. | 370/282 |
| 7,139,274 | B2* | 11/2006 | Attar et al. | 370/395.4 |
| 7,161,971 | B2* | 1/2007 | Tiedemann et al. | 375/141 |
| 7,286,501 | B2* | 10/2007 | Kwon et al. | 370/320 |
| 7,324,578 | B2* | 1/2008 | Kwon et al. | 375/135 |
| 7,376,076 | B2* | 5/2008 | You et al. | 370/209 |

* cited by examiner

*Primary Examiner*—Marceau Milord
(74) *Attorney, Agent, or Firm*—Roylance, Abrams, Berdo & Goodman, L.L.P.

(57) ABSTRACT

An apparatus and method for transmitting Walsh information over a packet data control channel in a base station of a mobile communication system that transmits packet data and has the packet data control channel for transmitting control information related to transmission of packet data. Receivers decode reverse ACK channel (R-ACKCH) signals received from corresponding mobile stations, and count the number of NAKs from the decoded information. A Walsh mask broadcasting controller receives the number of NAKs from the receivers, and outputs a Walsh mask information broadcasting enable signal if the number of NAKs is larger than a predetermined threshold. A transmitter generates and broadcasts Walsh mask information of the base station upon receiving the Walsh mask information broadcasting enable signal.

19 Claims, 10 Drawing Sheets

US 7,480,279 B2

APPARATUS AND METHOD FOR TRANSMITTING A CONTROL MESSAGE ON A PACKET DATA CONTROL CHANNEL IN A MOBILE COMMUNICATION SYSTEM SUPPORTING A PACKET DATA SERVICE

PRIORITY

This application claims the benefit under 35 U.S.C. § 119(a) to an application entitled "Apparatus and Method for Transmitting Control Message on Packet Data Control Channel in a Mobile Communication System Supporting Packet Data Service" filed in the Korean Intellectual Property Office on Oct. 14, 2003 and assigned Ser. No. 2003-71457, the entire contents of which are incorporated herein by reference.

BACKGROUND OF THE INVENTION

1. Field of the Invention

The present invention relates generally to an apparatus and method for improving a success rate of data transmission in a mobile communication system. In particular, the present invention relates to an apparatus and method for improving reception efficiency of packet data control information in a mobile communication system supporting packet data transmission.

2. Description of the Related Art

Mobile communication systems are provided to allow mobile stations to perform communication regardless of their locations. A Code Division Multiple Access (CDMA) system is a typical example of the mobile communication system. The CDMA system, a synchronous mobile communication system, has been evolving from an IS-95 system into IS-2000 system, CDMA2000 1× Evolution for Data Only (1×EV-DO) system, and CDMA2000 1× Evolution for Data & Voice (1×EV-DV) system. Currently, as for the synchronous mobile communication system, standardization on the CDMA2000 1×EV-DV system has entered its final phase.

All the systems stated above can support packet data transmission, and the CDMA2000 1×EV-DO system and the CDMA2000 1×EV-DV system can support high-speed packet data transmission. The two systems support high-speed packet data transmission using different schemes. First, a description will be made of packet data transmission in the CDMA2000 1×EV-DV system, the most advanced mobile communication system.

FIG. 1 is a block diagram for a packet data service in a CDMA2000 1×EV-DV system based on the current standard. As illustrated in FIG. 1, a base station (BS) 100 has a plurality of mobile stations (MSs) 111, 112 and 113. To transmit forward high-speed packet data to a particular mobile station, the base station 100 transmits the data over a forward packet data channel ( ). In order to transmit data over the high-speed packet data channel, the base station 100 should necessarily transmit a forward packet data control channel (F-PDCCH) with the F-PDCH. That is, according to the standard, the F-PDCCH has the same transmission duration and transmission instant as the F-PDCH for carrying a transmission packet. Thus, two types of data on a packet data channel and a packet data control channel are simultaneously transmitted to a mobile station. Therefore, the packet data control channel is a physical channel that the base station 100 should necessarily transmit in order to transmit a packet data service to a particular mobile station. Information transmitted over the packet data control channel includes:

1) Walsh_Mask: information on a fragmented Walsh code available for a forward packet data channel (F-PDCH) at stated periods.
2) MAC_ID (Medium Access Control layer Identification): MAC ID of a mobile station (MS) to which F-PDCH is assigned.
3) ACID (ARQ (Automatic Repeat Request) Channel ID): ID for identifying 4 ARQ channels.
4) SPID (Subpacket ID): ID for identifying an IR pattern of a subpacket.
5) EP_NEW: information for identifying two consecutive encoder packets in the same ARQ channel.
6) EP_SIZE: size (or number) of bits constituting an encoder packet.
7) LWCI (Last Walsh Code Index): information on a Walsh code used for F-PDCH.

In the CDMA2000 1×EV-DV system, a forward packet data control channel has 3 types of slot formats: 1-slot format, 2-slot format and 4-slot format, and each slot is 1.25 msec long. Therefore, the 1-slot format, 2-slot format and 4-slot format have transmission durations of 1.25 msec, 2.5 msec and 5.0 msec. respectively.

When the base station 100 transmits packet data to a mobile station, a target mobile station to which the packet data is to be transmitted is selected by a scheduler (not shown in FIG. 1) included in the base station 100. The scheduler in the base station 100 selects a target mobile station to which it will transmit packet data at every transmission instant by considering channel information and a status of a buffer in which the transmission data is stored. The channel information includes a carrier-to-noise ratio (CNR) or a carrier-to-interference ratio (CIR). After selecting a particular target mobile station by considering the channel information and the buffer status information, the scheduler in the base station 100 also determines the number of slots for which it will transmit packet data. In this case, however, the base station does not transmit slot format information (SFI) of a forward packet data control channel (F-PDCCH), determined by the base station 100, to the target mobile station receiving the packet data. Therefore, an F-PDCCH receiver of the mobile station must detect slot format information (SFI) determined by the base station 100 from a received F-PDCCH signal. Such a slot format detection scheme in which an F-PDCCH receiver of a mobile station detects a slot format is called "Blind Slot Format Detection (BSFD)."

FIG. 2 is a block diagram of a transmitter for transmitting data on a forward packet data control channel and a control message on the packet data control channel based on the 1×EV-DV standard. In FIG. 2, 1-slot format, 2-slot format and 4-slot format are represented by n=1, n=2 and n=4, respectively. Different symbol repetition and symbol puncturing are selectively used according to the slot formats. A description will now be made of information transmitted in FIG. 2, and a structure and operation for processing the information.

A control message 201 transmitted over a forward packet data control channel comprises the information described above, and the control message 201 comprises 13 bits. In FIG. 2, an expression of "1.25n" refers to the product of a unit slot length of 1.25 msec and a slot format value of 'n'. The 13-bit control message 201 is input to an adder 211. In addition, because the CDMA2000 133 EV-DV system is a synchronous system, a system time 202 matched to a reference time is input to an offset selector 210. The system time is used to randomize information bits transmitted over a forward packet data control channel and convert the randomized information bits into a random sequence. Therefore, a 13-bit random number is received from the system time every 1.25 msec. Accordingly, the offset selector 210 generates an offset to be used in the base station using the received system time, and outputs the offset to the adder 211. The adder 211 adds the received control message 201 to the offset in synchronism with the system time, and outputs the addition result to a Medium Access Control layer Identification (MAC_ID) combiner 212.

The MAC_ID combiner 212 receives an 8-bit MAC_ID 203 for identifying users. The MAC_ID combiner 212 exclusive-ORs (XORs) the received control message and the 8-bit MAC_ID 203 according to a particular binary pattern. XORing the control message and the MAC_ID 203 in the MAC_ID combiner 212 is performed because double CRCs are used. The double CRCs can be classified into an "outer frame quality indicator" and an "inner frame quality indicator." The outer frame quality indicator is XORed with the MAC_ID. Therefore, in FIG. 2, the MAC_ID combiner 212 is represented by an "8-bit CRC-covered MAC_ID."

Information output from the MAC_ID combiner 212 is input to a CRC adder 213. The CRC adder 213 adds an 8-bit CRC to the information output from the MAC_ID combiner 212 so that a receiver can determine whether a received control message is defective. The output of the CRC adder 213 becomes an inner frame quality indicator. Information output from the CRC adder 213 is input to a tail bit adder 214. The tail bit adder 214 adds 8 tail bits to the CRC-added information. The tail bits are used for zero state termination performed in a convolutional encoder 215. That is, if a 13-bit information word to which the MAC_ID and CRC are added are input together with 8 tail bits, a convolutional code always terminates at a zero state on a trellis. Information output from the tail bit adder 214 is input to the convolutional encoder 215. The convolutional encoder 215 performs encoding for correcting an error in a transmission control message from noises occurring in a radio environment of a forward packet data control channel. A coding rate is set differently according to the slot format.

An output of the convolutional encoder 215 undergoes symbol repetition in a symbol repeater 216, and undergoes symbol puncturing in a symbol puncturer 217, and an output of the symbol puncturer 217 is input to a block interleaver 218. In the symbol repeater 216 and the symbol puncturer 217, symbol repetition and symbol puncturing are also performed differently according to slot format, as shown in the bottom of FIG. 2. The block interleaver 218 block-interleaves input symbols according to the slot format, and the block-interleaved symbols undergo signal mapping in a signal point mapper 219. The mapped symbols after being block-interleaved are multiplied by a channel gain in a channel gainer 220, and then transmitted over a forward packet data control channel.

A description will now be made of a structure of a receiver for receiving a forward packet data control channel and a method for checking performance of the receiver in a CDMA2000 1×EV-DV system using the forward packet data control channel. FIG. 3 is a simplified block diagram of a forward packet data control channel receiver for receiving information on a forward packet data control channel in a CDMA2000 1×EV-DV system.

Referring to FIG. 3, a transmission control message, or data, is input to a double CRC adder 301, and the CRC adder 301 performs double CRC processing on the received control message using MAC_ID and CRC added thereto. The double CRC-processed data is coded in a convolutional encoder 302. The coded symbols are subjected to symbol repetition and symbol puncturing in a symbol repeating and puncturing part 303, and then subjected to channel interleaving in a channel interleaver 304. The channel interleaver 304 is used to scatter burst errors occurring in a received signal due to multipath fading channel. The symbols interleaved by the channel interleaver 304 are input to a receiver through a channel environment 310.

The receiver is roughly divided into a reception processor 320 and a blind detector 330. A description will first be made of the reception processor 320. A channel deinterleaver 321 deinterleaves channel-interleaved symbols. The deinterleaved symbols are input to a symbol combining and erasure insertion part 322. The symbol combining and erasure insertion part 322 performs a reverse process of the symbol repetition and symbol puncturing process performed for transmission of a forward packet data control channel, on the deinterleaved symbols. The symbols output from the symbol combining and erasure insertion part 322 are input to a Viterbi decoder 323. The Viterbi decoder 323 is a general decoder used for decoding the symbols convolutional-coded by the convolutional encoder 302. The Viterbi decoder 323 decodes the convolution-coded symbols and outputs a control message. A CRC/MAC_ID checker 324 checks CRC and MAC_ID in the control message. A method detecting a control message on a forward packet data control channel in the CRC/MAC_ID checker 324 can be roughly divided into the following two methods.

In a first method, a receiver performs CRC check using both a Viterbi-decoded 13-bit information word and an inner CRC coded with MAC_ID, and then detects a control message therefrom. In a second method, the receiver additionally performs outer CRC check, or actual CRC check, after performing the first CRC check, and detects a control message only when the two CRC check results are both good.

A detailed description will now be made of 7 types of control messages transmitted over the packet data control channel. As illustrated in FIG. 4A, a message transmitted over the packet data control channel can be roughly divided into two parts. FIG. 4A is a diagram illustrating a format of a control message transmitted over a packet data control channel. As illustrated in FIG. 4A, a control message transmitted over a packet data control channel is roughly divided into a MAC_ID field 410 and a service data unit (SDU) field 420. The MAC_ID field 410 comprises 8 bits and the SDU field 420 comprises 13 bits, so that the packet data control channel receives information of a total of 21 bits. To indicate that packet data is transmitted over a packet data channel, the SDU field 420 indicates a control message on a packet data control channel is configured as illustrated in FIG. 4B. To transmit information indicating early termination of cell switching or conversion to an activated mode, the control message is configured as illustrated in 4C. Finally, to transmit information on a Walsh mask available for all mobile stations located in a base station to the mobile stations, the control message on a packet data control channel is configured as illustrated in FIG. 4D. As illustrated in FIG. 4D, when information on a Walsh mask available for mobile stations is transmitted, the MAC_ID field 410 comprises all zero bits. In this case, a Walsh mask to be used for all mobile stations in communication with a corresponding base station must be changed. Therefore, the mobile station always checks the MAC_ID when decoding a forward packet data control channel, and performs different operations according to whether the MAC_ID has all zero bits.

For high-speed data transmission, the CDMA2000 1×EV-DV system employs Fast Hybrid Automatic Repeat Request (FHARQ) in order to improve the performance of a physical channel. Commonly, FHARQ uses N ARQ channels, and the CDMA2000 1×EV-DV system employs N=4 FHARQ. With reference to FIGS. 5A and 5B, an example of N=4 FHARQ will be described herein below.

FIG. 5A is a timing diagram illustrating transmission of packet data and ACK/NAK signal in a CDMA2000 1×EV-DV system employing N=4 FHARQ in which packet data is continuously transmitted to mobile stations.

As illustrated in FIG. 5A, a base station, or a transmitter, can continuously transmit data through a maximum of 4 HARQ channels. Therefore, in the case where the base station continuously performs HARQ transmission to 4 mobile stations A, B, C and D, the mobile station A is assigned HARQ ID=0, the mobile station B is assigned HARQ ID=1, the mobile station C is assigned HARQ ID=2, the mobile station D is assigned HARQ ID=3. Thereafter, HARQ ID=0 can be reassigned to the mobile station A, or to another mobile station. In the case of FIGS. 5A and 5B, HARQ ID=0 is reassigned to the mobile station A. A transmission scheme in which FHARQ channels are assigned to different users in this manner is called "user diversity." User diversity has been proposed to maximize efficiency of channel resources.

Referring to FIG. 5A, packet data 510a to be transmitted to the mobile station A is transmitted over a forward packet data channel 511 and information on the packet data 510a is transmitted over a forward packet data control channel 512. Then a receiver, or the mobile station A, receives packet data 510b that experienced a change in radio channel environment. Thereafter, the receiver has a no-operation interval (NOI) 502a for which it receives no signal over a packet data channel and a packet data control channel until an FHAQR channel is assigned again thereto. For the NOI 502a, the receiver performs demodulation and decoding on the received packet data, and transmits a response signal, or ACK/NAK signal, over a reverse ACK channel (R-ACKCH). Then the base station transmits new packet data if an ACK signal is received from the mobile station A, and retransmits the initially-transmitted packet data if a NAK signal is received from the mobile station A. The packet data to be initially transmitted or to be retransmitted is represented by reference numeral 520a, and the packet data that experienced a change in radio channel environment is represented by reference numeral 520b.

With reference to FIG. 5A, a description has been made of the NOI 502a for which data is transmitted to other mobile stations. As another example, there is a no-operation interval for which all mobile stations are inactivated as no data is transmitted from the base station to the mobile stations. A description thereof will be made with reference to FIG. 5B.

FIG. 5B is a timing diagram illustrating transmission of packet data and ACK/NAK signal in a CDMA2000 1×EV-DV system employing N=4 FHARQ in which there is an interval for which no packet data is transmitted. Referring to FIG. 5B, packet data 510a to be transmitted from the base station to the mobile station A is transmitted over a forward packet data channel 511 and information on the packet data 510a is transmitted over a forward packet data control channel 512. Then a receiver, or the mobile station A, receives packet data 510b that experienced a change in radio channel environment. Thereafter, the receiver has a no-operation interval (NOI) 502b for which it receives no signal over a packet data channel and a packet data control channel until a FHAQR channel is assigned again thereto. The NOI 502b is different from the NOI 502a. The base station transmits packet data to other mobile station for the NOI 502a, but the base station transmits packet data to none of the mobile stations for the NOI 502b. To distinguish the NOIs from each other, the NOI 502a will be refereed to as a "transmission NOI," and the NOI 502b will be referred to as a "non-transmission NOI." For the non-transmission NOI, no data is transmitted and only noises are transmitted. Thus, for both the non-transmission NOI and the transmission NOI, the mobile station A is not assigned a packet data control channel, so that it should not perform any operation.

Referring back to FIG. 5B, the receiver receiving the packet data performs demodulation and decoding on the received packet data, and transmits an ACK/NAK signal over a reverse ACK channel (R-ACKCH). Then the base station transmits new packet data if an ACK signal is received from the mobile station A, and retransmits the initially-transmitted packet data if a NAK signal is received from the mobile station A. In the case of FIG. 5B, the mobile station A retransmits an ACK/NAK signal 514 as the base station fails to receive an initially-transmitted ACK/NAK signal 513. The packet data to be initially transmitted or to be retransmitted in response to the retransmitted ACK/NAK signal 514 is represented by reference numeral 520a, and the packet data that experienced a change in radio channel environment is represented by reference numeral 520b.

In other case, all FHARQ channels may be assigned to only one mobile station. However, a description thereof will be omitted herein.

According to the CDMA2000 1×EV-DV standard, a mobile station using a packet data channel for packet transmission demodulates packet data received over the packet data channel only when a packet data control channel is assigned thereto. Based on the demodulation result, the mobile station transmits an ACK/NAK signal over a reverse ACK channel. In an actual operation of the system, however, a mobile station may possibly make an error due to noises and disturbances occurring in a channel. The mobile station makes an error in the following cases.

First, although a base station transmits packet data and a packet data control message to a particular mobile station, the mobile station may fail to correctly receive the packet data control message due to noises or disturbances in a packet data control channel. In this case, due to an error in the packet data control channel, the mobile station cannot recognize whether a packet data channel is transmitted. Therefore, the mobile station fails to receive packet data transmitted by the base station. Although the mobile station receives packet data over a packet data channel, it fails in decoding the packet data received over the packet data channel due to a defective control message. In this case, the mobile station transmits a NAK signal over a reverse ACK channel. However, because the packet data can be retransmitted by FHARQ, the mobile station does not have a serious problem except a slight delay and a reduction in transmission efficiency of channels.

Second, although a base station transmits packet data and a packet data control message to a particular mobile station, the mobile station may fail to correctly receive the packet data and the packet data control message due to noises or disturbances in a packet data control channel. In particular, the MAC_ID has all zero bits as illustrated in FIG. 4D due to an error in the packet data control channel. In this case, because the MAC_ID has all zero bits, the mobile station mistakes the packet data control message for Walsh mask update information. Therefore, the mobile station changes its own Walsh mask due to the wrong information. Thereafter, although the base station transmits packet data, the mobile station cannot decode packet data received over a packet data channel due to a Walsh decoding error. This continues until the Walsh mask is updated. Therefore, when the base station transmits packet data to the mobile station whose Walsh mask is updated due to an error, the mobile station cannot continuously receive packet data, thereby interrupting a packet data service.

This will be described with reference to FIG. 6 by way of example. FIG. 6 is a timing diagram illustrating a time for which a mobile station fails to receive packet data as a Walsh mask is changed due to an error in a forward packet data control channel. Referring to FIG. 6, a Walsh mask currently in use is transmitted at a time T0. A base station configures a Walsh mask into a control message illustrated in FIG. 4D, and transmits the control message over a packet data control channel at stated periods. In FIG. 6, a Walsh mask update period 600 ranges from the time T0 to a time T2. Therefore, the receiver should continuously use the Walsh mask received at the time T0 until a time at which it receives the next Walsh mask. However, in the second case, the mobile station cannot continuously receive packet data from a time T1 at which a Walsh mask is changed due to a Walsh mask error (See 602) to the time T2 at which the Walsh mask is updated.

If the Walsh mask is updated in this way, even though the receiver determines from a packet data control channel that packet data is transmitted thereto, it fails in demodulating and decoding the packet data. Therefore, the receiver continuously transmits a NAK signal over a reverse ACK channel each time packet data is received. Such a false NAK signal is called a "false alarm."

Third, when a base station transmits packet data and a packet data control message to a particular mobile station, a mobile station may mistake the packet data control message for its packet data control message due to noises or disturbances in the packet data control channel. In this case, the mobile station fails in decoding packet data received over a forward packet data channel, so that it cannot extract normal data. Therefore, the mobile station transmits a NAK signal over a reverse ACK channel. In this case, however, because the base station transmitted no packet data to the mobile station, the base station is allowed to disregard the NAK signal received over the reverse ACK channel. Alternatively, the mobile station can check again the control message which was not transmitted thereto through MAC ID detection. Therefore, in this case, the mobile station does not have a serious problem. However, occupation of a reverse ACK channel (R-ACKCH) for reverse transmission of an ACK/NAK signal and a reverse channel quality indicator channel (R-CQICH) for CIR transmission by a non-selected mobile station causes unnecessary occupation of reverse channel resources and interference to R-ACKCH of a normal mobile station, thereby deteriorating the quality of an R-ACKCH signal from the selected mobile station.

Fourth, when a base station transmits packet data and a packet data control message to a particular mobile station, a mobile station may mistake the packet data control message for its packet data control message due to noises or disturbances in the packet data control channel and, particularly, mistakes MAC_ID for all-zero MAC_ID, i.e., Walsh mask update information, due to an error in the forward packet data control channel. In this case, the mobile station changes its own Walsh mask due to the incorrect information. Therefore, although the mobile station decodes packet data received over the forward packet data channel, most of the packet data suffers from decoding error because of a Walsh demodulation error. Thus, the mobile station transmits a NAK signal over a reverse ACK channel. As described in the second case, such an event is continuously repeated unless the Walsh mask is updated again.

As described above, when the Walsh mask is changed due to an error in a packet data control channel, an error continuously occurs in received packet data. Therefore, unless the base station transmits again a Walsh mask, a reception error for a forward packet data channel continuously occurs due to the wrong Walsh mask information. Such an event can happen in the case of FIGS. 5A and 5B. Accordingly, a transmitter, or a base station, requires a function capable of diagnosing and correcting defective Walsh mask information for a mobile station due to the error in a forward packet data control channel.

SUMMARY OF THE INVENTION

It is, therefore, an object of the present invention to provide an apparatus and method for correcting a possible false alarm from occurring in a mobile communication system that transmits packet data over a packet data channel and transmits Walsh mask information over a packet data control channel.

It is another object of the present invention to provide an apparatus and method for increasing channel efficiency by rapidly removing a false alarm for a channel in a mobile communication system that transmits packet data over a packet data channel and transmits Walsh mask information over a packet data control channel.

It is further another object of the present invention to provide an apparatus and method for reducing interference caused by a false alarm in a mobile communication system that transmits packet data over a packet data channel and transmits Walsh mask information over a packet data control channel.

In accordance with a first aspect of the present invention, there is provided an apparatus for transmitting Walsh information over a packet data control channel in a base station of a mobile communication system that transmits packet data and has the packet data control channel for transmitting control information related to transmission of packet data. The apparatus comprises receivers for decoding reverse ACK channel (R-ACKCH) signals received from corresponding mobile stations, and counting the number of NAKs from the decoded information; a Walsh mask broadcasting controller for receiving the number of NAKs from the receivers, and outputting a Walsh mask information broadcasting enable signal if the number of NAKs is larger than a predetermined threshold; and a transmitter for generating and broadcasting Walsh mask information of the base station upon receiving the Walsh mask information broadcasting enable signal.

In accordance with a second aspect of the present invention, there is provided an apparatus for transmitting Walsh information over a packet data control channel in a base station of a mobile communication system that transmits packet data and has the packet data control channel for transmitting control information related to transmission of packet data. The apparatus comprises decoders for decoding reverse ACK channel (R-ACKCH) signals received from corresponding mobile stations; first counters being identical in number to the decoders, for counting NAKs if the NAKs are continuously output from corresponding decoders; a Walsh mask broadcasting controller for receiving the number of NAKs from the counters, and outputting a Walsh mask information broadcasting enable signal if the number of NAKs is larger than a predetermined threshold; and a transmitter for generating and broadcasting Walsh mask information of the base station upon receiving the Walsh mask information broadcasting enable signal.

In accordance with a third aspect of the present invention, there is provided a method for transmitting Walsh information over a packet data control channel in a base station of a mobile communication system that transmits packet data and has the packet data control channel for transmitting control information related to transmission of packet data. The method comprises the steps of initializing NAK counters for a mobile station when the base station transmits packet data in response to a forward packet data service request from the mobile station, and increasing a count value if NAK for the packet data is received from the mobile station over a reverse ACK channel (R-ACKCH); and broadcasting Walsh mask information if the count value exceeds a predetermined threshold.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
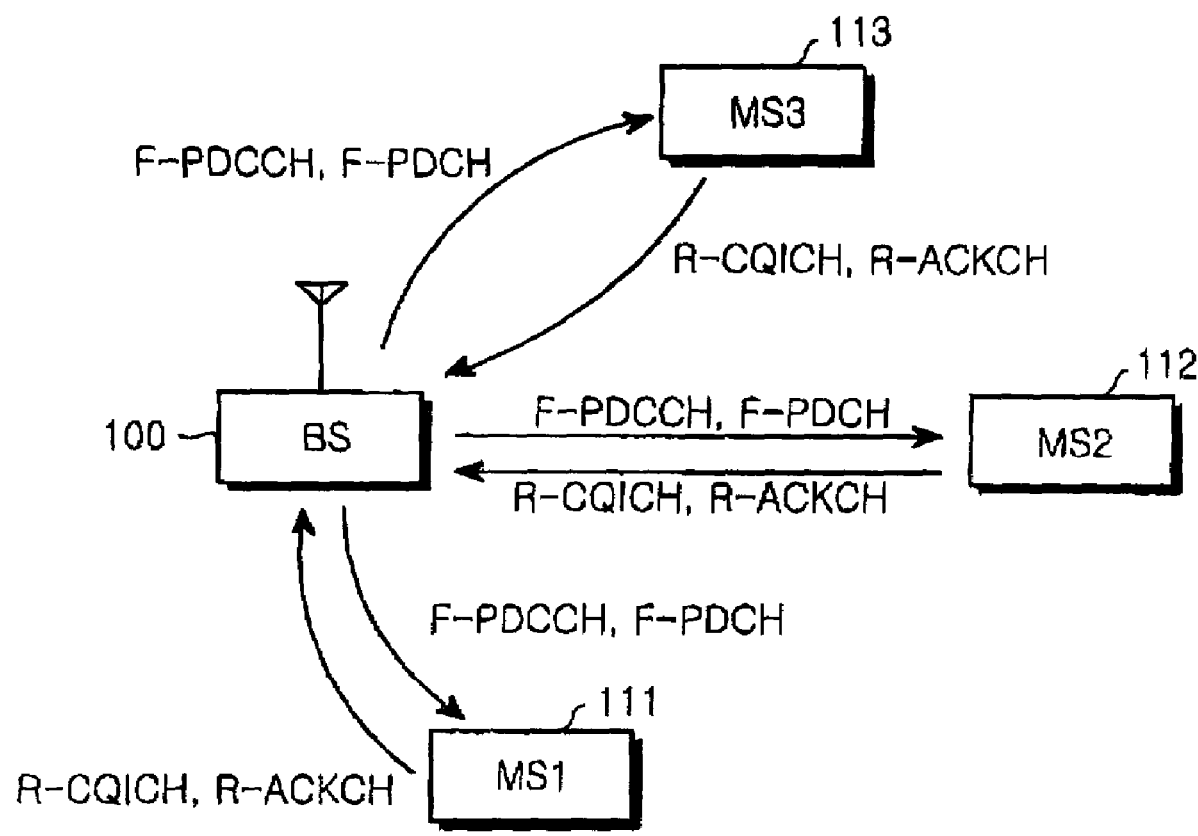
FIG. 1 is a block diagram for a conventional packet data service in a Code Division Multiple Access 2000 (CDMA2000) 1× Evolution-Data and Voice (1×EV-DV) system based on the current standard.
Figure 2:
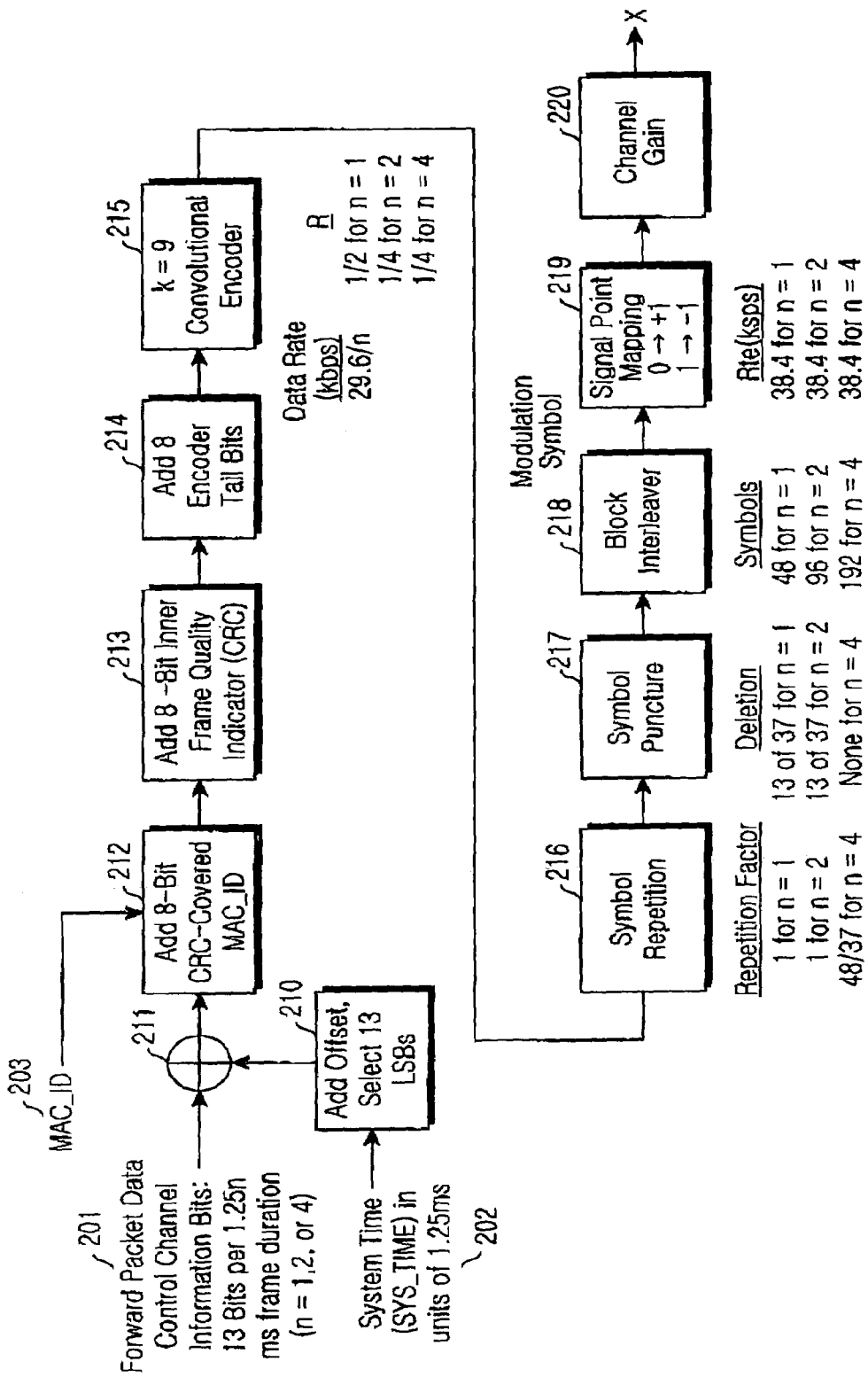
FIG. 2 is a block diagram of a conventional transmitter for transmitting data on a forward packet data control channel and a control message on the packet data control channel based on the 1×EV-DV standard.
Figure 3:
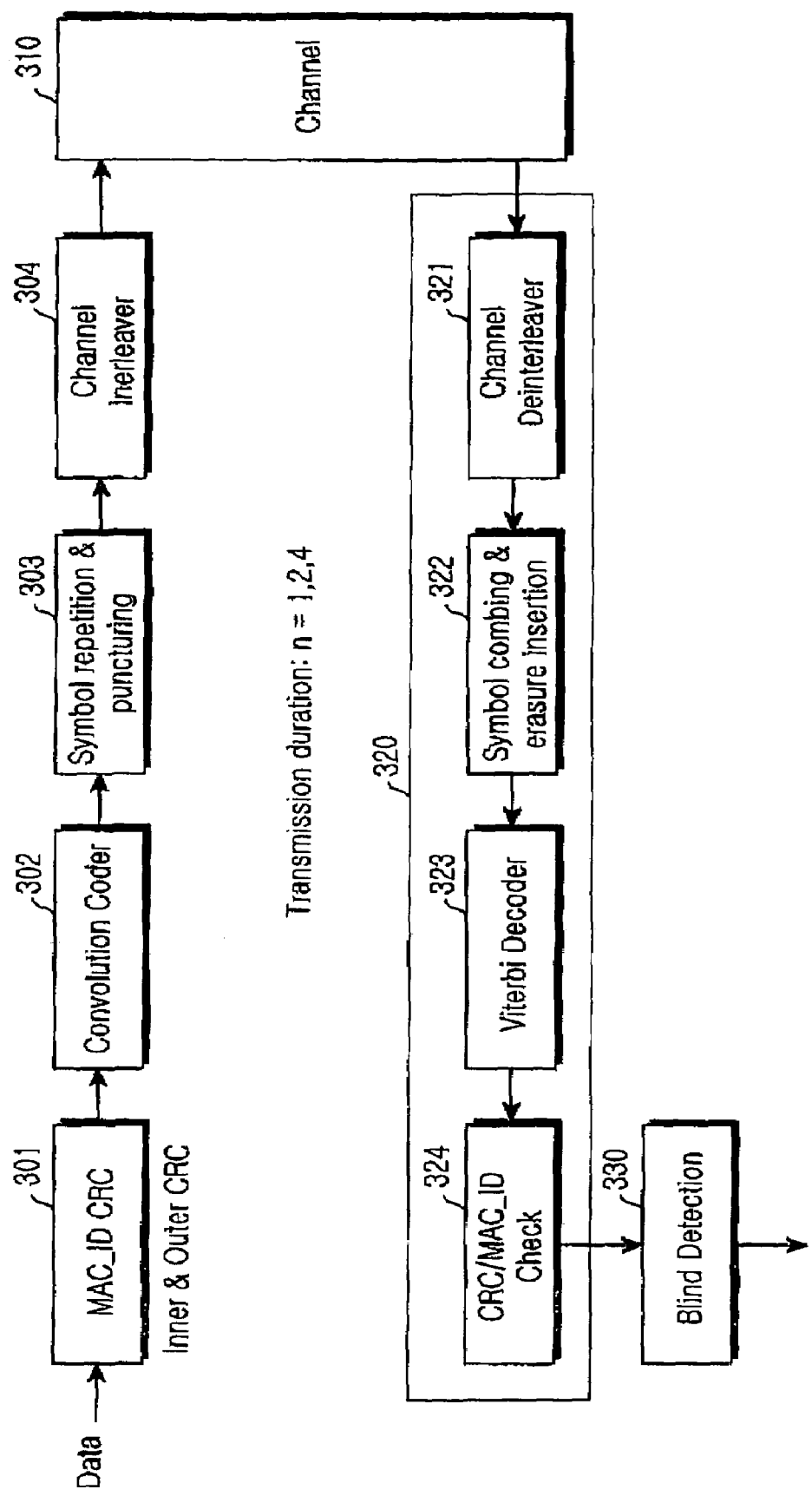
FIG. 3 is a simplified block diagram of a conventional forward packet data control channel receiver for receiving information on a forward packet data control channel in a CDMA2000 1×EV-DV system.

An embodiment of the present invention will now be described in detail with reference to the accompanying drawings. In the drawings, the same or similar elements are denoted by the same reference numerals even though they are depicted in different drawings. In the following description, a detailed description of known functions and configurations incorporated herein has been omitted for conciseness.

Figure 4A:
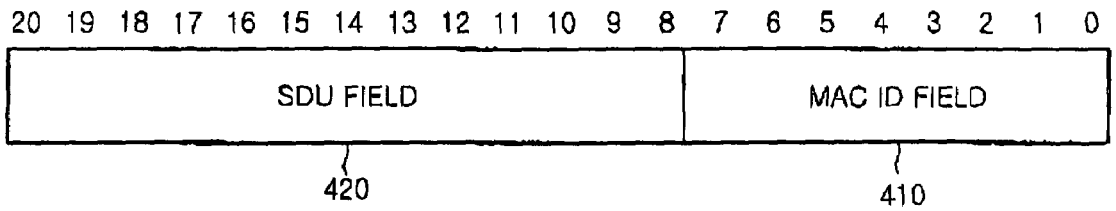
FIGS. 4A to 4D are diagrams illustrating possible formats of a conventional control message transmitted over a packet data control channel.
Figure 4B:
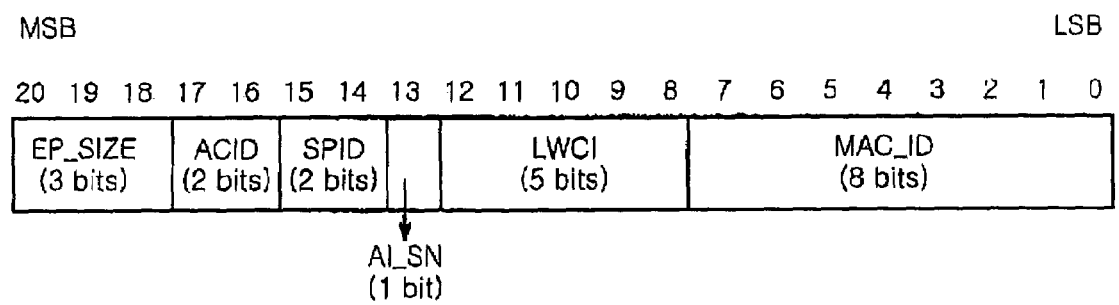
Figure 4C:
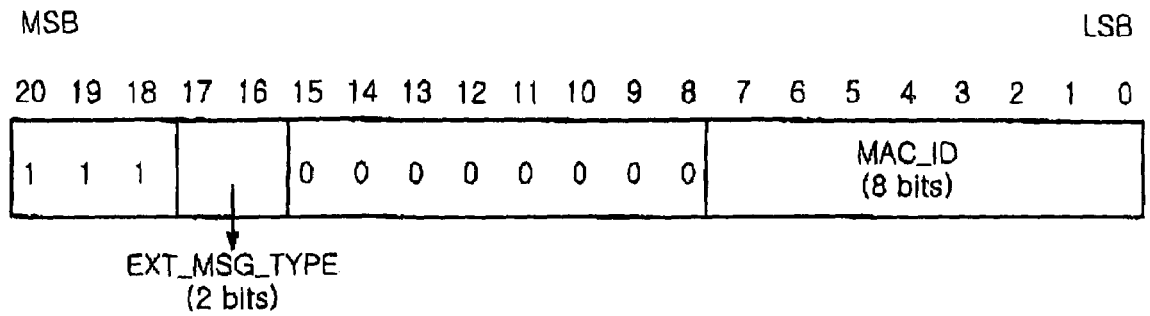

A description will first be made of a method for transmitting packet data used in a Code Division Multiple Access 2000 (CDMA2000) 1× Evolution-Data and Voice (1×EV-DV) system. To transit one encoder packet (EP), a plurality of subpackets (SPs) are transmitted. For example, when a coding rate of one encoder packet is 1/5, an encoder receives 100 information bits and outputs 500 symbols. A certain part of coded symbols are selected according to the number of the coded symbols, and it is defined in a standard that different symbols are transmitted for initial transmission, first retransmission, and second retransmission. Because different symbols are transmitted for initial transmission, first retransmission, and second retransmission, a subpacket identifier (SPID) is used to inform a mobile station of a configuration of currently-transmitted coded symbols. The SPID is transmitted to a mobile station over a forward packet data control channel having a message format illustrated in FIG. 4B. It is defined in the CDMA2000 1×EV-DV standard that SPID='0' should be used for initial transmission. For retransmissions, SPID is determined by a retransmission scheme defined in the CDMA2000 1×EV-DV. A mobile station performs demodulation and decoding on each subpacket transmission, and transmits a response signal (or ACK/NAK signal) to a base station, or a transmitter, according to the demodulation/decoding result. Generally, if there is no response to a transmitted subpacket from a mobile station, a base station considers that it receives a NAK signal. In addition, the base station determines the maximum number Max_ReTx of retransmissions in implementing the system, and supports retransmission for one encoder packet as many times as up to Max_ReTx.

The embodiment of the present invention provides a method for removing a possible false alarm occurring in the foregoing environment. A description will now be provided of the embodiment of the present invention. A base station defines and records the number of NAKs generated for subpackets corresponding to the same encoder packet in a NAK counter NUM_NAK_n for every active mobile station (AMSs) in service, registered in its scheduler. In addition, the base station defines and records the number of NAKs generated for different encoder packets in an encoder packet's NAK counter NUM_NAK_EP_n. The embodiment of the present invention provides a base station having an apparatus with the counters stated above, for efficiently coping with a false alarm.

Figure 7:
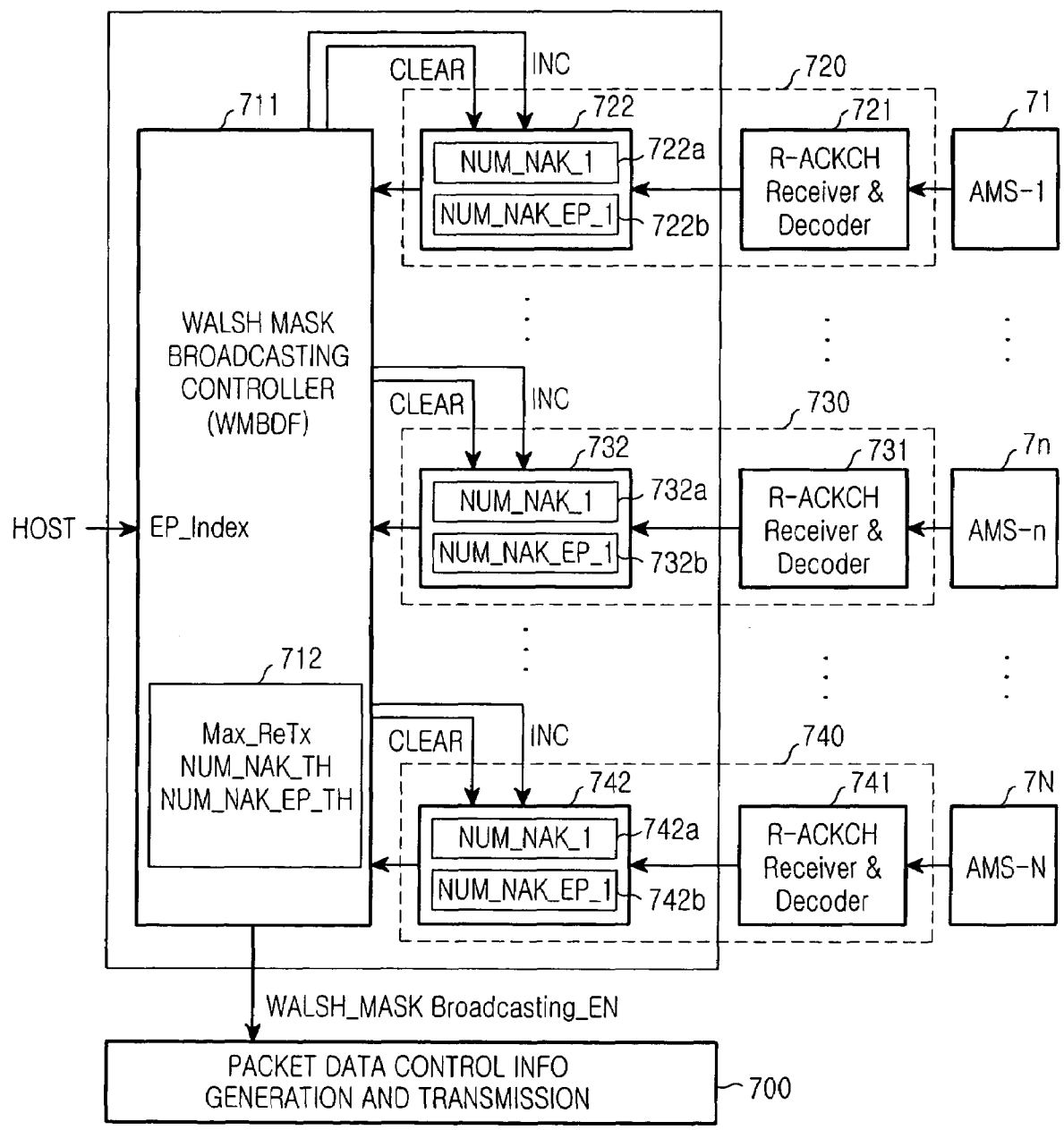
FIG. 7 is a block diagram of a base station apparatus for detecting a false alarm and broadcasting a Walsh mask according to an embodiment of the present invention.

FIG. 7 is a block diagram of a base station apparatus for detecting a false alarm and broadcasting a Walsh mask according to an embodiment of the present invention. With reference to FIG. 7, a detailed description will be made of structure and operation of an apparatus for detecting a false alarm in a base station apparatus according to an embodiment of the present invention.

Referring to FIG. 7, an apparatus for determining to broadcast a Walsh mask according to an embodiment of the present invention, for use in a base station apparatus, is roughly divided into receivers 720, 730 and 740 for receiving ACK/NAK signals from corresponding mobile stations, a Walsh mask broadcasting controller (or a Walsh mask broadcasting decision function (WMBDF)) 711 for controlling broadcasting of a Walsh mask, and a packet data control information generation and transmission part 700 for generating control information and transmitting the control information over a packet data control channel. The receivers 720, 730 and 740, being mapped to active mobile stations 71, 7n and 7N, receive signals from the mobile stations 71, 7n and 7N over a reverse ACK channel (R-ACKCH), and decode the received signals. Further, the receivers 720, 730 and 740 include memories for storing NAK signals according to the decoding results. More specifically, the receivers 720, 730 and 740 include R-ACKCH receiving and decoding units 721, 731 and 741 respectively for receiving and decoding R-ACKCH signals from the mobile stations 71, 7n and 7N; NUM_NAK_n counters 722a, 732a and 742a for performing a counting operation when NAKs for the same encoder packet are received from the R-ACKCH receiving and decoding units 721, 731 and 741; and NUM_NAK_EP_n counters 722b, 732b and 742b for performing a counting operation when NAKs for different encoder packets are received from the R-ACKCH receiving and decoding units 721, 731 and 741. These counters are provided according to an embodiment of the present invention. The NUM_NAK_EP_n counters 722b, 732b and 742b for performing a counting operation when NAKs for different encoder packets are received perform scheduling on an asynchronous encoder packet generated in multiuser diversity used in a CEMA2000 1×EV-DV system.

According to the up-to-date technology, a base station uses counters only for limiting the number of retransmissions to Max_ReTx. However, in the embodiment of the present invention, a base station uses Max_ReTx as a factor for determining to transmit a Walsh mask, stores the number of successive errors of an encoder packet as well as the Max_ReTx, and uses both the Max_ReTx and the number of errors as a factor for determining to transmit a Walsh mask. The Walsh mask broadcasting controller 711 has Max_ReTx, a threshold NUM_NAK_TH for a NAK signal for the same encoder packet, and a threshold NUM_NAK_EP_TH for a NAK signal for different encoder packets, all of which are received from another device or stored in its internal memory 712. It is shown in FIG. 12 that the values are stored in a separate buffer or memory.

The Walsh mask broadcasting controller 711, having a Walsh mask broadcasting decision function (WMBDF), receives values of the NUM_NAK_n counters 722a, 732a and 742a, and the NUM_NAK_EP_n counters 722b, 732b and 742b for storing decoding results on R-ACKCH signals received from the active mobile stations (AMSs) 71, 7n and 7N. Further, the Walsh mask broadcasting controller 711 determines whether to broadcast a Walsh mask using an encoder packet index EP_index indicating transmission order of encoder packets transmitted from a host in the base station, and thresholds MAX_NAK_TH and MAX_NAK_EP_TH for final decision. In addition, the Walsh mask broadcasting controller 711 generates CLEAR signals and INCREASE signals for the counters 722, 732 and 742. When a Walsh mask broadcasting enable signal WALSH_MASK Broadcasting_EN is received from the Walsh mask broadcasting controller 711, the packet data control information generation and transmission part 700 broadcasts a Walsh mask thereby providing Walsh mask information to all mobile stations.

Figure 4D:
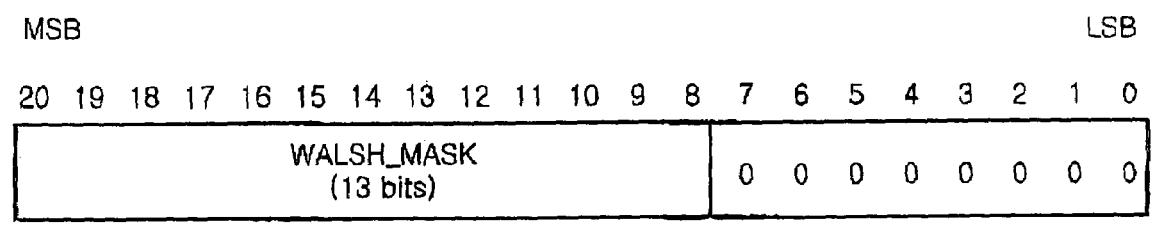
Figure 5A:
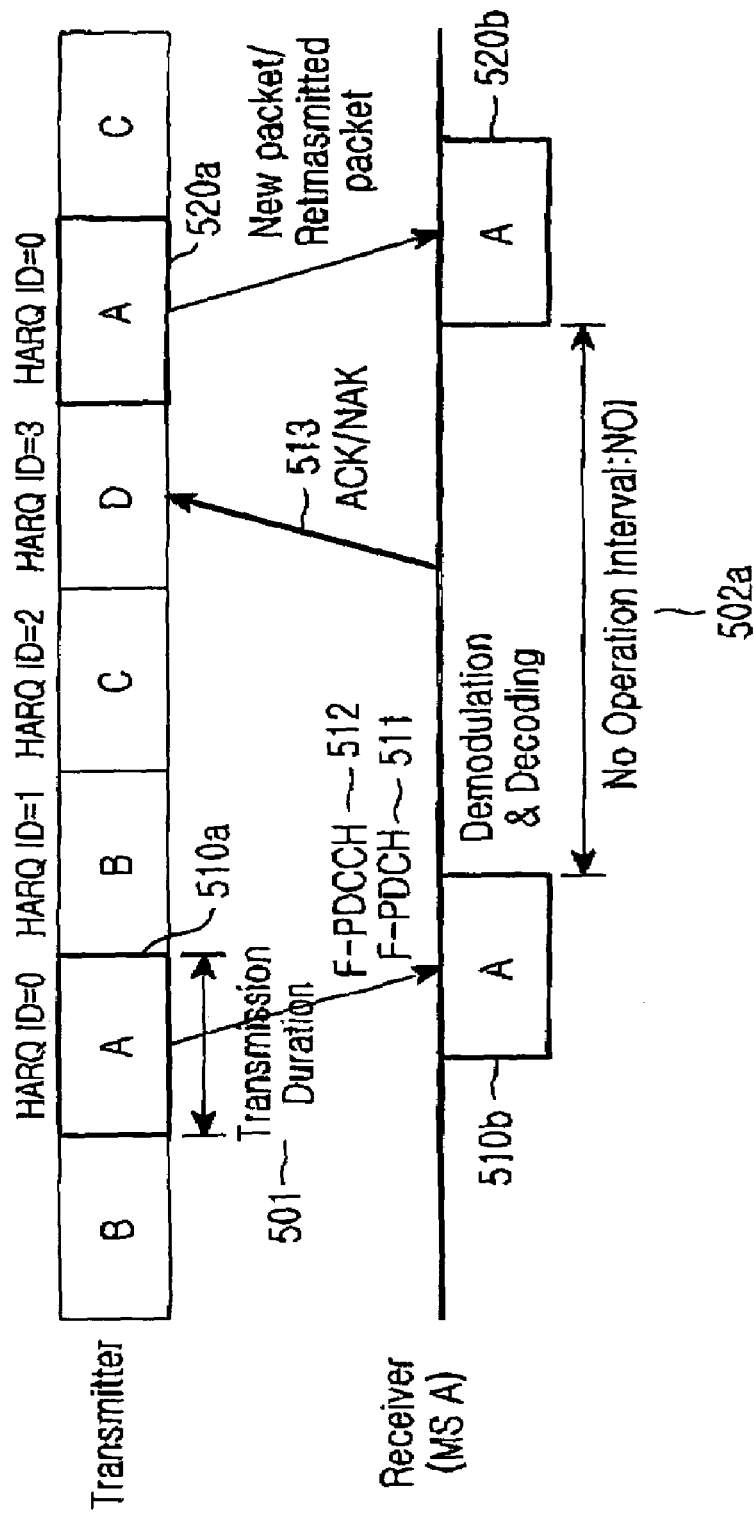
FIG. 5A is a timing diagram illustrating transmission of packet data and ACK/NAK signal in a conventional CDMA2000 1×EV-DV system employing N=4 FHARQ in which packet data is continuously transmitted to mobile stations.
Figure 5B:
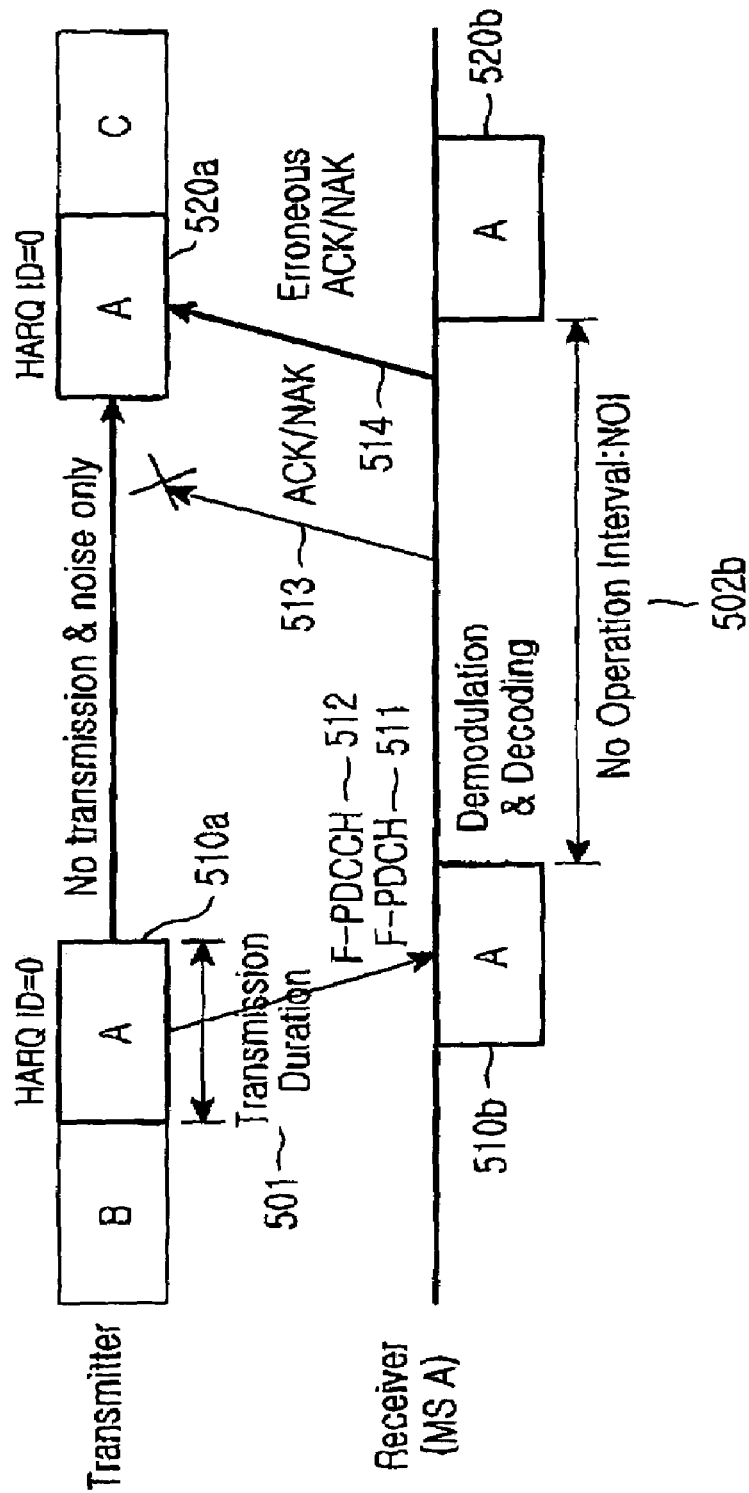
FIG. 5B is a timing diagram illustrating transmission of packet data and ACK/NAK signal in a conventional CDMA2000 1×EV-DV system employing N=4 FHARQ in which there is an interval for which no packet data is transmitted.
Figure 6:
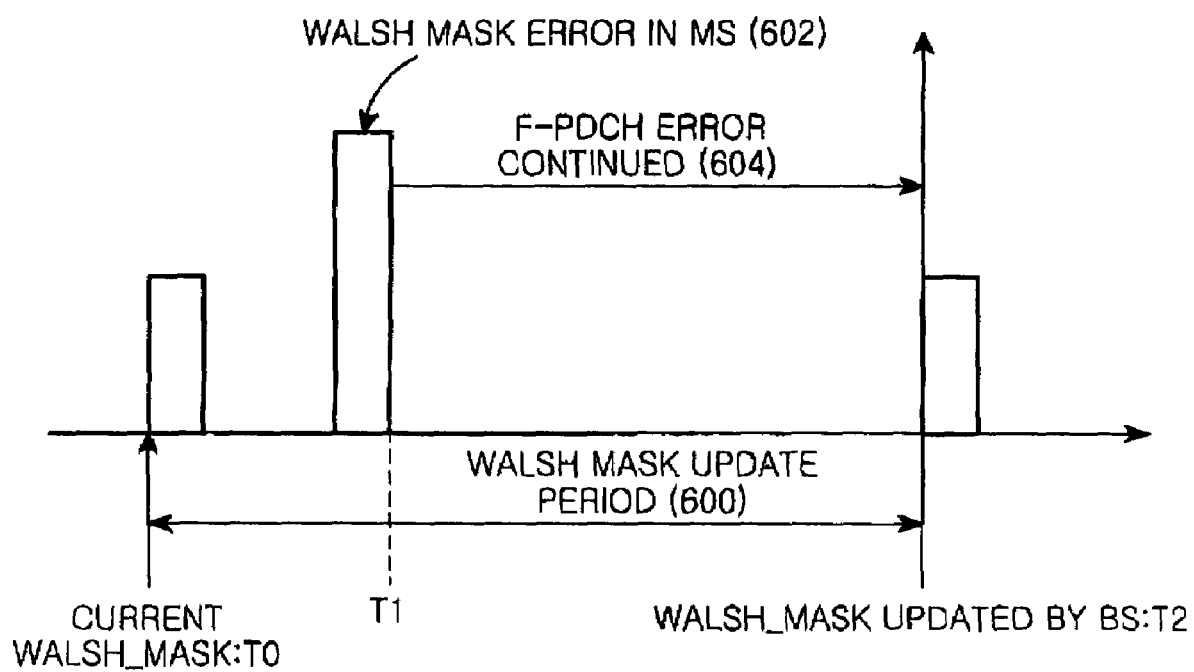
FIG. 6 is a timing diagram illustrating a time for which a conventional mobile station fails to receive packet data as a Walsh mask is changed due to an error in a forward packet data control channel.

A description will now be made of an operation of the apparatus described above. Because all of the R-ACKCH receiving and decoding units 721, 731 and 741 perform the same operation, a description of the operation will be made herein with reference to only the R-ACKCH receiving and decoding unit 721, for simplicity. The active mobile station 71 decodes packet data received over a forward packet data channel, and transmits the decoding result over an R-ACKCH. Then the R-ACKCH receiving and decoding unit 721 in the R-ACKCH receiver 720 of the base station detects a NAK or ACK. If the R-ACKCH receiving and decoding unit 721 detects a NAK signal, it outputs the detected NAK signal to the counter 722. A detailed description of the counting operation will be given below. The counter 722 resets its counters 722a and 722b upon receiving a CLEAR signal from the Walsh mask broadcasting controller 711. Further, the counter 722 increases a corresponding counter according to a received NAK signal upon receiving an INCREASE signal. The increase and decrease of the counter 722 will be separately described herein below. After the counting operation, the counter 722 outputs a count value to the Walsh mask broadcasting controller 711. Then the Walsh mask broadcasting controller 711 compares the count value with thresholds stored in the memory 712, and determines whether it is necessary to broadcast Walsh mask information. If it is determined that it is necessary to broadcast Walsh mask information, the Walsh mask broadcasting controller 711 outputs a Walsh mask broadcasting enable signal to the packet data control information generation and transmission part 700. The packet data control information generation and transmission part 700 receiving the Walsh mask broadcasting enable signal generates information on a currently-available Walsh mask and a control message for Walsh mask updating, i.e., a Walsh mask update control message illustrated in FIG. 4D, and broadcasts the generated information and control message to all mobile stations. Based on the control message, the mobile stations update again a Walsh mask thereby reducing a false alarm.

A description will now be made of a method for increasing a corresponding counter by the counter 722.

(1) NUM_NAK_n Counter or NUM_NAK_EP_n Counter is Increased

Method 1: Such an event occurs when for an encoder packet for which NAK is generated although a base station has transmitted the encoder packet as many times as Max_ReTx, the base station increases priority in scheduling to continuously restart transmission of the same encoder packet from the beginning. In this case, the base station continuously increases a value of NUM_NAK_n by '+1' without initializing the NUM_NAK_n, but holds a value of NUM_NAK_EP_n without increasing the NUM_NAK_EP_n.

Method 2: Such an event occurs for an encoder packet for which NAK is generated although a base station has transmitted the encoder packet as many times as Max_ReTx, the base station decreases priority in scheduling to delay or remove a transmission time. In this case, the base station initializes NUM_NAK_n to '0', but increases NUM_NAK_EP_n by '+1'.

Next, a description will be made of a method for initializing NUM_NAK_n and NUM_NAK_EP_n to '0' by the base station.

(2) NUM_NAK_n Counter is Initialized to '0'

A. Such an event occurs when a base station registers a mobile station, from which a packet service request is received, as an active MS. That is, the event happens when the base station receives a forward packet data channel (F-PDCH) request from a mobile station over an R-CQICH and registers the corresponding mobile station in its scheduler as an active MS to transmit an encoder packet having a MAC_ID of the mobile station.

B. Such an event occurs when a base station receives ACK from a mobile station in response to a transmitted encoder packet. That is, the event happens when the base station transmits a new encoder packet.

C. Such an event occurs for an encoder packet for which NAK is generated although a base station has transmitted the encoder packet as many times as Max_ReTx, the base station decreases priority in scheduling to delay or remove a transmission time. That is, the event happens when the base station transmits a new encoder packet although NAK is received in response to a transmitted encoder packet.

D. Such an event occurs when a base station broadcasts a Walsh mask to all mobile stations over a forward packet data control channel.

For all of the four cases described above, the NUM_NAK_n counter is initialized to '0'.

(3) NUM_NAK_EP_n Counter is Initialized to '0'

A. Such an event occurs when a base station registers a mobile station, from which a packet service request is received, as an active MS. That is, the event occurs when the base station receives a forward packet data channel (F-PDCH) request from a mobile station over an R-CQICH and registers the corresponding mobile station in its scheduler as an active MS to transmit an encoder packet having MAC_ID of the mobile station.

B. Such an event occurs when a base station broadcasts a Walsh mask to all mobile stations over a forward packet data control channel.

C. Such an event happens when a base station receives ACK from a mobile station in response to a transmitted encoder packet. That is, the event occurs when the base station transmits a new encoder packet.

In this manner, the base station determines whether to broadcast a Walsh mask over a forward packet data control channel using the following method based on values of the NUM_NAK_ counter and the NUM_NAK_EP_n counter which are continuously changed from the initial value of '0'. In making such a determination, the Walsh mask broadcasting controller 711 stores a threshold NUM_NAK_TH for the NUM_NAK_n counter and a threshold NUM_NAK_EP_TH for the NUM_NAK_EP_n counter in the memory 712, and determines whether to broadcast a Walsh mask according to a result of the comparison described below.

(4) Method of Determining to Broadcast Walsh Mask

A base station broadcasts a Walsh mask over a forward packet data control channel if any one of the following two conditions is satisfied.

Condition 1: "NUM_NAK_EP_n>NUM_NAK_EP_TH" is satisfied.

Condition 2: "NUM_NAK_EP_n>NUM_NAK_EP_TH" & "NUM_NAK_n>NUM_NAK_TH" are both satisfied.

In the foregoing two conditions, because determining a threshold is an issue of implementation, an example thereof will be described herein. For example, the CDMA2000 1×EV-DV system can calculate a reception error probability detected in a receiver for each subpacket according to modulation and coding schemes of noise and the type of transmission signal on a channel. For example, an initially-transmitted subpacket will be defined as SP(0), and an error probability of SP(0) will be defined as $P_\varepsilon(SP(0))$. If a mobile station decodes a received SP(0) and transmits NAK as a result of the decoding, a base station retransmits a new SP(1). The mobile station receiving the SP(0) and SP(1) soft-combines the received SP(0) and SP(1) for decoding. Error probability of the SP generated by soft-combining the SP(0) and the SP(1) is generally exponentially decreased as compared with error probability of only the SP(0). In the same manner, when SP is retransmitted as many times as Max_ReTx, error probability of an encoder packet transmitted over all of the forward packet data channels can be calculated by $$P_\varepsilon(F\text{-}PDCH \text{ is error}) = P_\varepsilon(SP(0)) \times P_\varepsilon(SP(0) \cup SP(1)) \times \ldots \times \quad (1)$$
$$P_\varepsilon(SP(0) \cup SP(1) \ldots \cup SP(\text{Max\_ReTx}))$$
$$= \prod_{i=0}^{\text{Max\_ReTx}} \left( P_\varepsilon \left( \bigcup_{j=0}^{i} (SP(j)) \right) \right)$$

For example, when retransmission is performed as many times as K, error probability of an encoder packet transmitted over the forward packet data channels can be calculated by $$P_\varepsilon(F\text{-}PDCH \text{ is error}) = P_\varepsilon(SP(0)) \times P_\varepsilon(SP(0) \cup SP(1)) \times \ldots \times \quad (2)$$
$$P_\varepsilon(SP(0) \cup SP(1) \ldots \cup SP(K))$$
$$= \prod_{i=0}^{K} \left( P_\varepsilon \left( \bigcup_{j=0}^{i} (SP(j)) \right) \right)$$

In Equations (1) and (2), ∪ denotes soft combining of subpackets, and Π denotes the product of elements. In Equations (1) and (2), as 'i' is larger, corresponding error probability $$P_\varepsilon \left( \bigcup_{j=0}^{i} (SP(j)) \right)$$

is exponentially abruptly decreased. Therefore, if Max_ReTx is sufficiently large, an error occurs in a forward packet data channel due to successive retransmission of subpackets. As a result, there is very low probability that successive NAKs will be generated.

Therefore, thresholds needed in the above formulas can be calculated in the following manner. For example, error probability for a forward packet data channel for which a base station can assume that successive NAKs are caused by a Walsh mask error is defined as Pe_PDCH, a minimum integer K satisfying $$\prod_{i=0}^{K} \left( P_\varepsilon \left( \bigcup_{j=0}^{i} (SP(j)) \right) \right) \leq \text{Pe\_PDCH} \quad (3)$$

If error probability for which Max_ReTx is considered does not satisfy Equation (3), a minimum integer N satisfying Equation (4) is defined as NUM_NAK_EP_TH and a minimum integer K is defined as NUM_NAK_TH.

$$\prod_{i=0}^{N} \left( P_\varepsilon \left( \bigcup_{j=0}^{K} (SP(j)) \right) \right) \prod_{i=0}^{\text{Max\_ReTx}} \left( P_\varepsilon \left( \bigcup_{j=0}^{i} (SP(j)) \right) \right) \leq \text{Pe\_PDCH} \quad (4)$$

Figure 8:
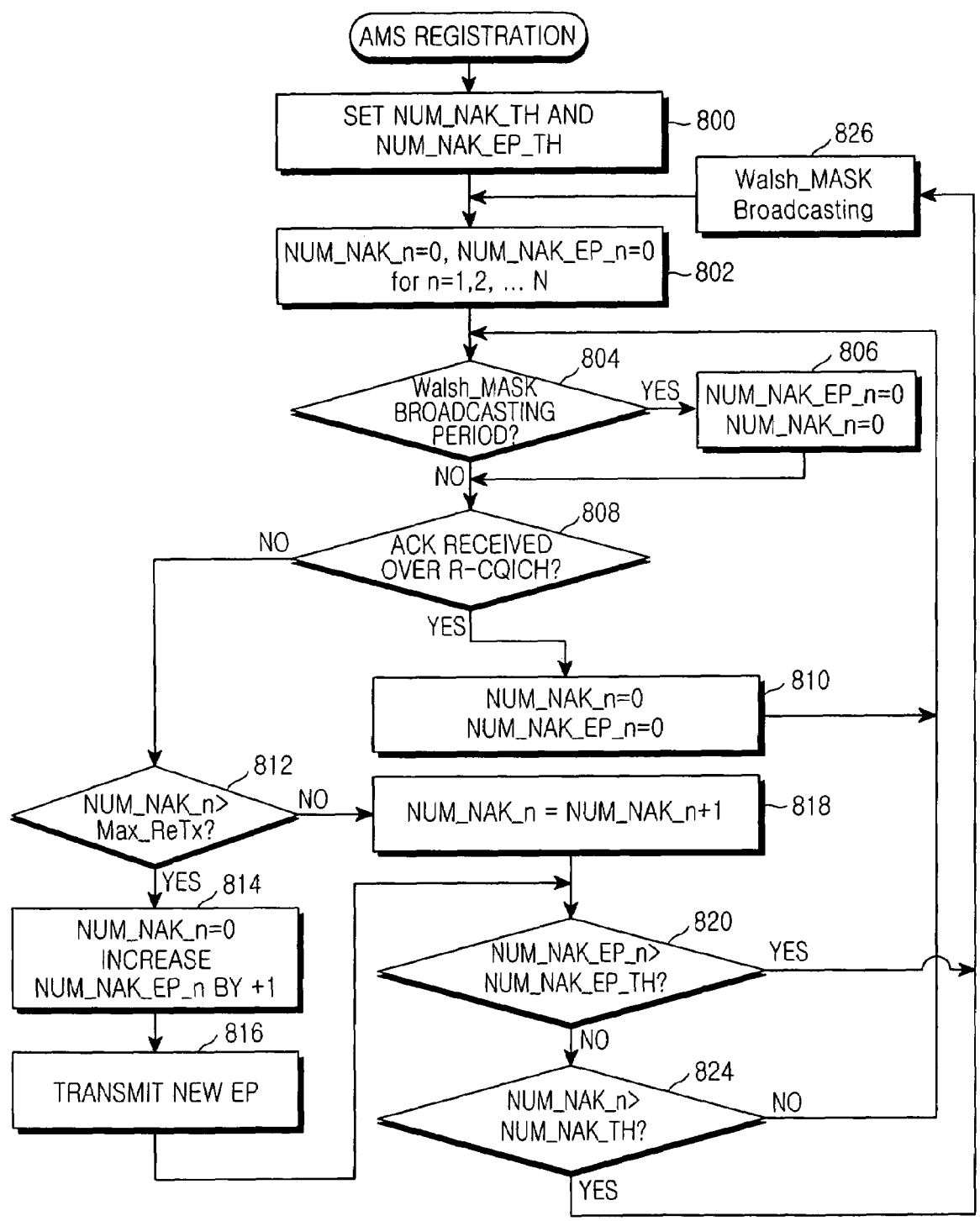
FIG. 8 is a flowchart illustrating a procedure for reducing a false alarm of a forward packet data control channel according to an embodiment of the present invention.

A description of the operation will be made with reference to FIG. 8. FIG. 8 is a flowchart illustrating a procedure for reducing a false alarm of a forward packet data control channel according to an embodiment of the present invention.

The procedure of FIG. 8 is performed when a base station approves a service request received from a mobile station to provide a service to the mobile station, and registers the mobile station as an active mobile station. If a base station registers a particular mobile station as an active mobile station in this manner, a Walsh mask broadcasting controller 711 of the base station reads, in step 800, thresholds NUM_NAK_TH and NUM_NAK_EP_TH for determining whether to broadcast a Walsh mask from a memory 712, or receives the thresholds from an external device and stores the received thresholds in the memory 712. Thereafter, in step 802, the Walsh mask broadcasting controller 711 initializes a NUM_NAK_n counter and a NUM_NAK_EP_n counter for the above two parameters to '0'. The counters are included in a receiver in communication with a corresponding mobile station. In step 804, the Walsh mask broadcasting controller 711 determines whether it is a Walsh mask broadcasting period. If it is determined that it is a Walsh mask broadcasting period, the Walsh mask broadcasting controller 711 proceeds to step 806 where it initializes again both of the two counters to '0'. However, if it is determined in step 804 that it is not a Walsh mask broadcasting period, the Walsh mask broadcasting controller 711 determines in step 808 whether an ACK signal is received over R-CQICH. If it is determined in step 808 that an ACK signal is received over R-CQICH, the Walsh mask broadcasting controller 711 proceeds to step 810 where it initializes both of the two counters to '0'. Both counters are initialized because it can be assumed that the mobile station is normally using a Walsh mask.

However, if a NAK signal rather than the ACK signal is received over the R-CQICH, or if no ACK/NAK signal is received although the base station transmitted packet data, the Walsh mask broadcasting controller 711 determines in step 812 whether a count value of the NUM_NAK_n counter is larger than Max_ReTx. If it is determined in step 812 that a count value of the NUM_NAK_n counter is larger than Max_ReTx, the Walsh mask broadcasting controller 711 proceeds to step 814 where it increases the NUM_NAK_EP_n counter by '+1' because the count value of the NUM_NAK_n counter exceeds the maximum number of retransmissions. At the same time, the Walsh mask broadcasting controller 711 initializes the NUM_NAK_n counter to '0'. Thereafter, in step 816, the Walsh mask broadcasting controller 711 transmits a new encoder packet. However, if it is determined in step 812 that the value of the NUM_NAK_n counter is smaller than or equal to Max_ReTx, the Walsh mask broadcasting controller 711 proceeds to step 818 where it increases the NUM_NAK_n counter by '+1'.

After step 816 or 818, the Walsh mask broadcasting controller 711 determines in step 820 whether a value of the NUM_NAK_EP_n counter is larger than NUM_NAK_EP_TH. If it is determined in step 820 that a value of the NUM_NAK_EP_n counter is larger than NUM_NAK_EP_TH, the Walsh mask broadcasting controller 711 can determine that a Walsh mask in a particular active mobile station is changed because the value of the NUM_NAK_EP_n counter has already exceeded a possible error range of an encoder packet. Therefore, in this case, the Walsh mask broadcasting controller 711 proceeds to step 826 where it broadcasts a Walsh mask, and then returns to step 802 to initialize the NUM_NAK_n counter and the NUM_NAK_EP_n counter to '0'.

However, if it is determined in step 820 that a value of the NUM_NAK_EP_n counter is smaller than or equal to NUM_NAK_EP_TH, the Walsh mask broadcasting controller 711 performs a final check in step 824 because the value of the NUM_NAK_EP_n counter has reached the maximum encoder packet error. In step 824, the Walsh mask broadcasting controller 711 determines whether a value of the NUM_NAK_n counter is larger than NUM_NAK_TH. If it is determined in step 824 that a value of the NUM_NAK_n counter is larger than NUM_NAK_TH, the Walsh mask broadcasting controller 711 can consider that an error has occurred in a Walsh mask of a particular active mobile station. Therefore, the Walsh mask broadcasting controller 711 proceeds to step 826. However, if it is determined in step 824 that a value of the NUM_NAK_n counter is not larger than NUM_NAK_TH, the Walsh mask broadcasting controller 711 returns to step 804 and performs its succeeding steps.

When Method 1 is applied to the procedure of FIG. 8, it can be determined that Max_ReTx is set to a very large value. For example, if a base station sets Max_ReTx to 1000, it should continuously generate NAKs for a subpacket 1000 times to broadcast a Walsh mask. However, because such a case cannot occur, it can be determined that transmission is successively restarted for an EP which is retransmitted as many times as Max_ReTx. However, if Method 2 is applied to the procedure of FIG. 8, it can be determined that Max_ReTx is set to a possible appropriate constant. That is, if the number of subpacket errors continuously generated due to the threshold described above is 6, Max_ReTx is set to 6.

As can be understood from the foregoing description, the application of the embodiment of the present invention contributes to a reduction in misoperation of a mobile station due to a defective control message. In addition, because a mobile station in a false alarm state uses a newly updated Walsh code, the embodiment of the present invention can provide a high-quality service. Moreover, as a scheme proposed by the embodiment of the present invention is applied to an R-ACKCH receiver and an F-PDCCH transmitter of a base station, it is possible to reduce a Walsh mask update error caused by a MAC_ID error in a noise channel duration or a duration for which other users are serviced. This advantage contributes to a reduction in power consumption of a mobile station and to an increase in reverse channel capacity of the system.

While the invention has been shown and described with reference to a certain embodiment thereof, it should be understood by those skilled in the art that various changes in form and details may be made therein without departing from the spirit and scope of the invention as defined by the appended claims.

What is claimed is:

1. An apparatus for transmitting Walsh information over a packet data control channel in a base station of a mobile communication system that transmits packet data and has the packet data control channel for transmitting control information related to transmission of packet data, the apparatus comprising:

receivers for decoding reverse ACK channel (R-ACKCH) signals received from corresponding mobile stations, and counting the number of NAKs from the decoded information;

a Walsh mask broadcasting controller for receiving the number of NAKs from the receivers, and outputting a Walsh mask information broadcasting enable signal if the number of NAKs is larger than a predetermined threshold; and a transmitter for generating and broadcasting Walsh mask information of the base station upon receiving the Walsh mask information broadcasting enable signal.

2. The apparatus of claim 1, wherein the receiver comprises:

a decoder for receiving and decoding the R-ACKCH signal; and a counter for counting the number of NAKs if NAK is output from the decoder.

3. The apparatus of claim 2, wherein the counter comprises:

a first counter for counting NAKs continuously received for the same packet within the maximum number of retransmissions; and a second counter for counting if a NAK is received for the same packet in response to a packet transmitted as many times as the maximum number of retransmissions.

4. The apparatus of claim 3, wherein the Walsh mask broadcasting controller generates a control signal for initializing a value of the first counter when the NAK is received for the same packet as many times as the maximum number of retransmissions.

5. The apparatus of claim 3, wherein the Walsh mask broadcasting controller generates a control signal for initializing the first counter and the second counter if ACK is output from the decoder in response to the packet data transmitted in a forward direction.

6. The apparatus of claim 1, wherein the Walsh mask broadcasting controller further comprises a memory for storing the predetermined threshold.

7. The apparatus of claim 1, wherein the Walsh mask broadcasting controller initializes a counter value of the receiver if the Walsh mask information is broadcast through the transmitter.

8. The apparatus of claim 1, wherein the Walsh mask broadcasting controller initializes the counter if the base station sets a mobile station, from which a forward transmission request is received, as an active mobile station, and initially transmits forward packet data.

9. An apparatus for transmitting Walsh information over a packet data control channel in a base station of a mobile communication system that transmits packet data and has the packet data control channel for transmitting control information related to transmission of packet data, the apparatus comprising:
decoders for decoding reverse ACK channel (R-ACKCH) signals received from corresponding mobile stations;
first counters being identical in number to the decoders, for counting NAKs if the NAKs are continuously output from corresponding decoders;
a Walsh mask broadcasting controller for receiving the number of NAKs from the counters, and outputting a Walsh mask information broadcasting enable signal if the number of NAKs is larger than a predetermined threshold; and
a transmitter for generating and broadcasting Walsh mask information of the base station upon receiving the Walsh mask information broadcasting enable signal.

10. The apparatus of claim 9, further comprising second counters being identical in number to the decoders, for increasing the number of NAKs when a NAK of a packet is received after transmitting the packet as many times as the maximum number of retransmissions.

11. The apparatus of claim 10, wherein the Walsh mask broadcasting controller initializes the first counter and the second counter corresponding to the decoder when ACK is output from the decoder in response to a packet transmitted in a forward direction.

12. A method for transmitting Walsh information over a packet data control channel in a base station of a mobile communication system that transmits packet data and has the packet data control channel for transmitting control information related to transmission of packet data, the method comprising the steps of:
initializing NAK counters for a mobile station when the base station transmits packet data in response to a forward packet data service request from the mobile station, and increasing a count value if NAKs for the packet data are received from the mobile station over a reverse ACK channel (R-ACKCH); and
broadcasting Walsh mask information if the count value exceeds a predetermined threshold.

13. The method of claim 12, wherein the step of increasing a count value comprises the steps of:
enabling a first counter for counting NAKs continuously received for the same packet within the maximum number of retransmissions; and
enabling a second counter for counting a case where a NAK is received for the same packet in response to a packet transmitted as many times as the maximum number of retransmissions.

14. The method of claim 13, wherein the Walsh mask information is broadcast when a value of the first counter exceeds a predetermined threshold.

15. The method of claim 13, wherein the Walsh mask information is broadcast when a value of the second counter exceeds a predetermined threshold.

16. The method of claim 13, wherein the Walsh mask information is broadcast when a value of the first counter exceeds a first threshold and a value of the second counter exceeds a second threshold.

17. The method of claim 13, further comprising the step of initializing a value of the first counter if the NAK is received for the same packet as many times as the maximum number of retransmissions.

18. The method of claim 13, further comprising the step of initializing the first counter and the second counter if ACK is received over the R-ACKCH in response to the packet data transmitted in a forward direction.

19. The method of claim 12, further comprising the step of initializing a counter value of the receiver when transmitting the Walsh mask information.

* * * * *